US005945993A

United States Patent [19]

Fleischmann

[11] Patent Number: 5,945,993

[45] Date of Patent: Aug. 31, 1999

[54] PICTOGRAPH-BASED METHOD AND APPARATUS FOR CONTROLLING A PLURALITY OF LIGHTING LOADS

[75] Inventor: Marc Werner Fleischmann, Menlo Park, Calif.

[73] Assignee: Hewlett-Packard Company, Palo Alto, Calif.

[21] Appl. No.: 09/016,344

[22] Filed: Jan. 30, 1998

[51] Int. Cl.[6] .......... G06F 3/00

[52] U.S. Cl. .......... 345/339; 345/349

[58] Field of Search .......... 345/339, 340, 345/348, 349, 327–328, 326, 329, 330–338, 341–347, 350, 351, 352, 353, 354–355, 356, 357; 707/120–122; 364/578

[56] References Cited

U.S. PATENT DOCUMENTS

| | | | |
|---|---|---|---|
| 5,295,062 | 3/1994 | Fukushima | 364/188 |
| 5,307,295 | 4/1994 | Taylor et al. | 364/578 |
| 5,353,399 | 10/1994 | Kuwamoto et al. | 345/349 |
| 5,483,631 | 1/1996 | Nagai et al. | 345/339 |
| 5,600,643 | 2/1997 | Robrock | 370/399 |
| 5,650,800 | 7/1997 | Benson | 345/173 |
| 5,650,994 | 7/1997 | Daley | 370/259 |
| 5,657,221 | 8/1997 | Warman et al. | 364/188 |
| 5,734,853 | 3/1998 | Hendricks et al. | 345/352 |
| 5,838,316 | 11/1998 | Arruza | 345/334 |
| 5,839,095 | 11/1998 | Liu | 702/122 |
| 5,845,299 | 12/1998 | Anora et al. | 707/513 |
| 5,847,707 | 12/1998 | Hartman | 345/339 |
| 5,861,883 | 1/1999 | Cuomo et al. | 345/326 |
| 5,877,765 | 3/1999 | Dickman et al. | 345/349 |
| 5,877,957 | 3/1999 | Bennett | 364/191 |
| 5,884,079 | 3/1999 | Furusawa | 345/701 |

OTHER PUBLICATIONS

Brockschmidt, *Inside OLEZ*, Microsoft Press, Redmond WA., 1994.

*Primary Examiner*—Steven P. Sax

[57] ABSTRACT

A lighting control system for multiple lighting loads includes a computer that displays a pictograph and a lighting control panel. The pictograph includes selectable representations of the lighting loads. A particular lighting load is controlled by selecting a lighting state such as “on” or “off” on the lighting control panel and selecting a representation of the particular lighting load on the pictograph.

22 Claims, 9 Drawing Sheets

| | | | |
|---|---|---|---|
| Hdr | IP Addr | Intensity | ID |

PICTOGRAPH-BASED METHOD AND APPARATUS FOR CONTROLLING A PLURALITY OF LIGHTING LOADS

BACKGROUND OF THE INVENTION

The present invention relates generally to lighting control systems. More specifically, the present invention relates to a computer-based system for controlling power to multiple ac lighting loads.

Lighting loads in a large office building are typically controlled from a central location by a computer programmed with proprietary software. The computer can be programmed to turn on all office lighting loads before the start of business and turn off all of the office lighting loads after business hours. In addition to scheduling the times at which the lighting loads are turned on and off, the computer can also be programmed to perform annunciation of load status, central monitoring and reporting to ensure that the building is operating as efficiently as planned.

The computer typically interfaces with a plurality of transformer relays, which are located in junction boxes throughout the building. The computer can control each relay to apply or remove power from its associated lighting load and thereby turn its associated lighting load on or off. A lighting load can include a single light or multiple lights. The relays and, therefore, the lighting loads can also be controlled by wall-mounted switches and sensors distributed throughout the building. Such a system including a plurality of intelligent relay-based lighting control system is available from the General Electric Company under the names "Total Lighting Control" system and "TLC" systems.

However, controlling the lighting loads from a central location can cause problems for those people who come to work early or work late into the night. When the computer turns off the lights, some of the people inside the building will be left in the dark. Naturally, they will want to turn the lights back on. However, turning the lights back on can pose more than a mild inconvenience. A person must set aside his work, walk over to the light switch and flip on the switch. In a large work area having many different lights, finding the correct switch can be a challenge. Some lighting control systems do not even allow the lights to be manually overridden.

Instead, a facilities management is called and asked to turn the lights on. Hopefully the response will be prompt.

There are phone-based lighting control systems that allow a person to turn on the lights by dialing up a certain number. These phone-based systems map each available lighting load onto a corresponding phone number. However, such artificial phone number mappings are non-intuitive. For instance, a person might be required to memorize or look up a twelve-digit phone number in order to use the phone-based lighting control system. For this reason alone, the phone-based systems tend to be cumbersome to use. Additionally, typical phone-based lighting control systems do not allow the intensities of the lighting loads to be varied.

SUMMARY OF THE INVENTION

The present invention can be regarded as a computer that can control a plurality of lighting loads quickly and conveniently. The computer includes a display and memory encoded with executable instructions. When executed, the instructions cause the computer to show a pictograph and a control panel on the display. The pictograph includes selectable representations of the lighting loads, and the control panel allows a lighting load state to be entered into the computer. When a representation on the pictograph is selected, the instructions cause the computer to generate a lighting control request. The lighting control request identifies a lighting load corresponding to the selected representation and the lighting control state entered into the computer. The lighting control request is used for controlling the lighting load corresponding to the selected representation.

In one embodiment of the present invention, the computer is connectable to a computer network. This allows a person to control the lighting loads from the convenience of his or her desk.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
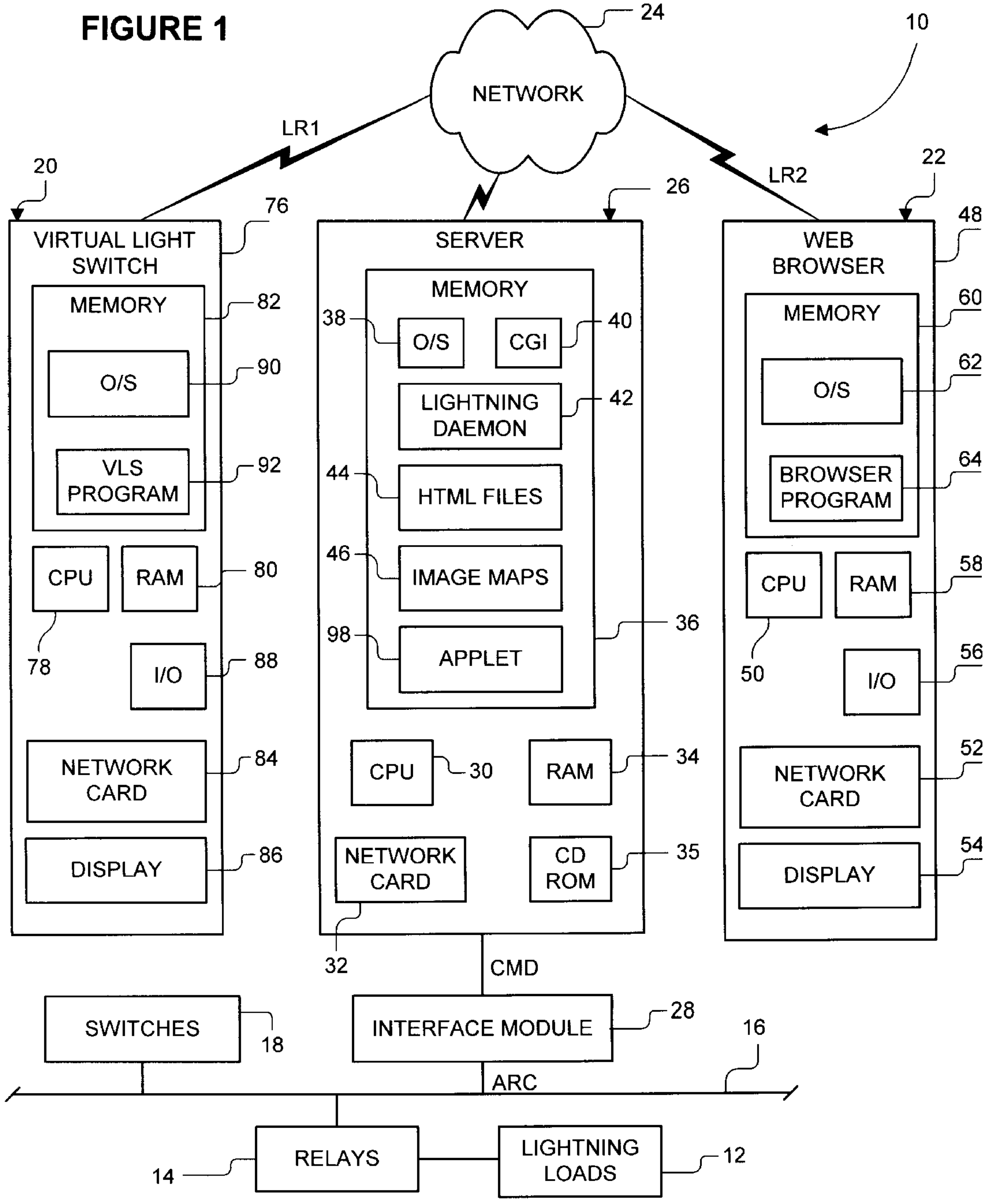
FIG. 1 is a schematic diagram of a lighting control system including a server, a web browser and a Virtual Light Switch.

As shown in the drawings for purposes of illustration, the invention is embodied in a lighting control system. The lighting control system allows distributed elements or Network Appliances connected to a computer network to control a plurality of lighting loads. Thus, a person can quickly turn lights on and off from the convenience of his or her desk. Moreover, the Network Appliances can include computers already connected to the network. Thus, the lighting control system can be expanded by using existing hardware. As a result, the lighting control system can be set up and expanded quickly and inexpensively.

FIG. 1 shows a lighting control system 10 for a plurality of lighting loads 12. The lighting loads 12 can be located in a facility such as an office building. A typical office building has multiple floors and lighting loads 12 on each floor. There might be one or more lighting loads 12 per office, or there might be one lighting load 12 covering several offices. The lighting loads 12 are turned on and off by relays 14, which are wired to a power/communications bus 16. The relays 14 are controlled by wall-mounted switches 18 and other devices such as daylight sensors and occupancy sensors located in the offices and at various locations in the building. Turning on a switch 18 causes a relay 14 to turn on an associated lighting load 12.

The relays 14 are also controlled by Network Appliances such as a Virtual Light Switch 20 and a web browser 22 connectable to a computer network 24. Typically, there would be more than one Virtual Light Switch 20 and more than one web browser 22. To simplify the description of the present invention, however, the lighting control system 10 will be described in connection with only one Virtual Light Switch 20 and only one web browser 22. The Virtual Light Switch 20 and the web browser 22 generate first and second lighting control requests LR1 and LR2, which identify states (e.g., lighting intensities) of specific lighting loads. The first and second lighting control requests LR1 and LR2 are sent over a computer network 24 to a server 26. The server 26, which might or might not be located in the same building as the lighting loads 12, receives the first and second lighting control requests LR1 and LR2 and responds by generating digital commands CMD. The digital commands CMD, which indicate the lighting load states indicated in the lighting control requests LR1 and LR2, are used to control the lighting loads 12.

The digital commands CMD are sent to an interface module 28. The interface module 28 allows the server 26 to link into the power/communications bus 16. Typically, the interface module 28 does not adhere to an open standard; instead, it expects the digital commands CMD to be in a proprietary format. Therefore, the server 26 generates the digital commands CMD in the proprietary format. The interface module 28 translates the digital commands CMD into analog relay commands ARC and places the analog relay commands ARC onto the power/communications bus 16. The analog relay commands ARC are received by all of the relays 14 coupled to the power/communications bus 16, but they control only specific relays 14. Thus, the analog relay commands ARC can control a specific relay 14 to turn on its associated lighting load 12, adjust brightness of its lighting load 12, etc. The interface module 28 also receives status signals on the power/communications bus 16. The status signals are placed on the power/communications bus 16 when, for instance, a light switch 18 is flipped on or off. Such relays 14, power/communication buses 16 and interface modules 28 are commonly used in lighting control systems. For example, the interface module 28 can be a TLC Dataline Communications Interface Module, which is available from GE Lighting Controls.

Figures 1A, 3:
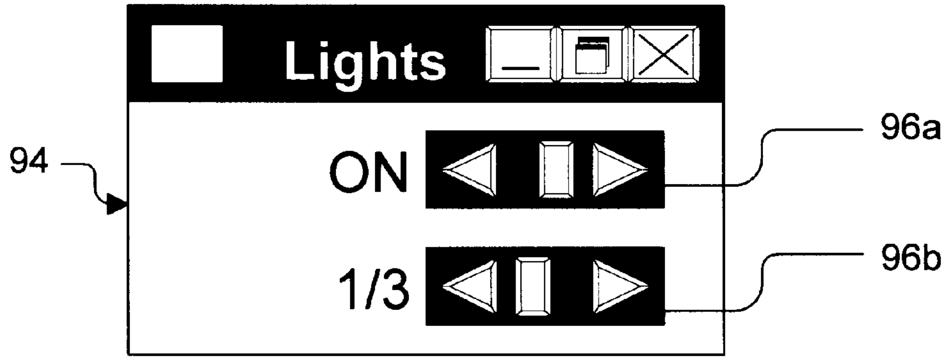
FIG. 1*a* illustrates a format for a first lighting control request.
FIG. 3 is an illustration of a control panel, which is displayed by the Virtual Light Switch.

The first lighting control request LR1 directly identifies a specific lighting load 12 and a state (e.g., lighting load intensity) for the identified lighting load 12. An exemplary first lighting load request LR1 including header information, a bit field for an ID number and a bit field for a lighting load intensity (e.g., 0=off, 1=⅓ intensity) is illustrated in FIG. 1*a*. The first lighting control requests LR1 are generated by Network Appliances such as the Virtual Light Switch 20. The second lighting control request LR2 identifies a lighting load state and indirectly identifies a specific lighting load 12 by providing information about the lighting load 12. The information is later translated in order to directly identify the specific lighting load 12. As discussed below, the second lighting control requests LR2 are generated by Network Appliances such as the web browser 22.

The computer network 24 can be anything from the Internet to a local area network ("LAN") using proprietary client-server software. The physical and link layers of the computer network 24 can be Ethernet, Token Ring or any other physical and link layer. The network layer can be Internet Protocol ("IP") or any other network protocol. The transport layer can be Transport Control Protocol ("TCP"), User Datagram Protocol ("UDP"), or any other transport protocol. The session layer can be Hypertext Transport Protocol ("HTTP"), File Transfer Protocol ("FTP"), "DCOM," "CORBA" or any other session protocol. Merely by way of example, the computer network 24 will be described as a LAN having an Ethernet backbone, and using TCP/IP and HTTP communication protocols.

The server 26 includes a central processing unit 30, a network card 32 for communicating over the computer network 24, RAM 34, and a memory storage device memory (e.g., a hard drive) 36 encoded with data. The data includes an operating system 38, interface program 40, a lighting daemon 42, multiple HTML files 44, and multiple image maps 46. Each HTML file 44 and image map 46 corresponds to a floor plan of the facility. The data can be loaded onto the memory storage device 36 via a peripheral device 35 such as a CD ROM drive, electronically transferred to the memory storage device 36 via the computer network 24, etc.

Each HTML file 44 includes a set of tags (i.e., instructions) for the web browser 22. The web browser 22 can be a first personal computer 48 including a central processing unit 50 and a network card 52 for communicating over the computer network 24. The first personal computer 48 further includes a display 54, I/O devices 56 such as a mouse and keyboard, RAM 58 and a hard drive 60 encoded with an operating system 62 and web browser program 64 such as "Netscape Navigator" or "Microsoft Internet Explorer."

Figure 2:
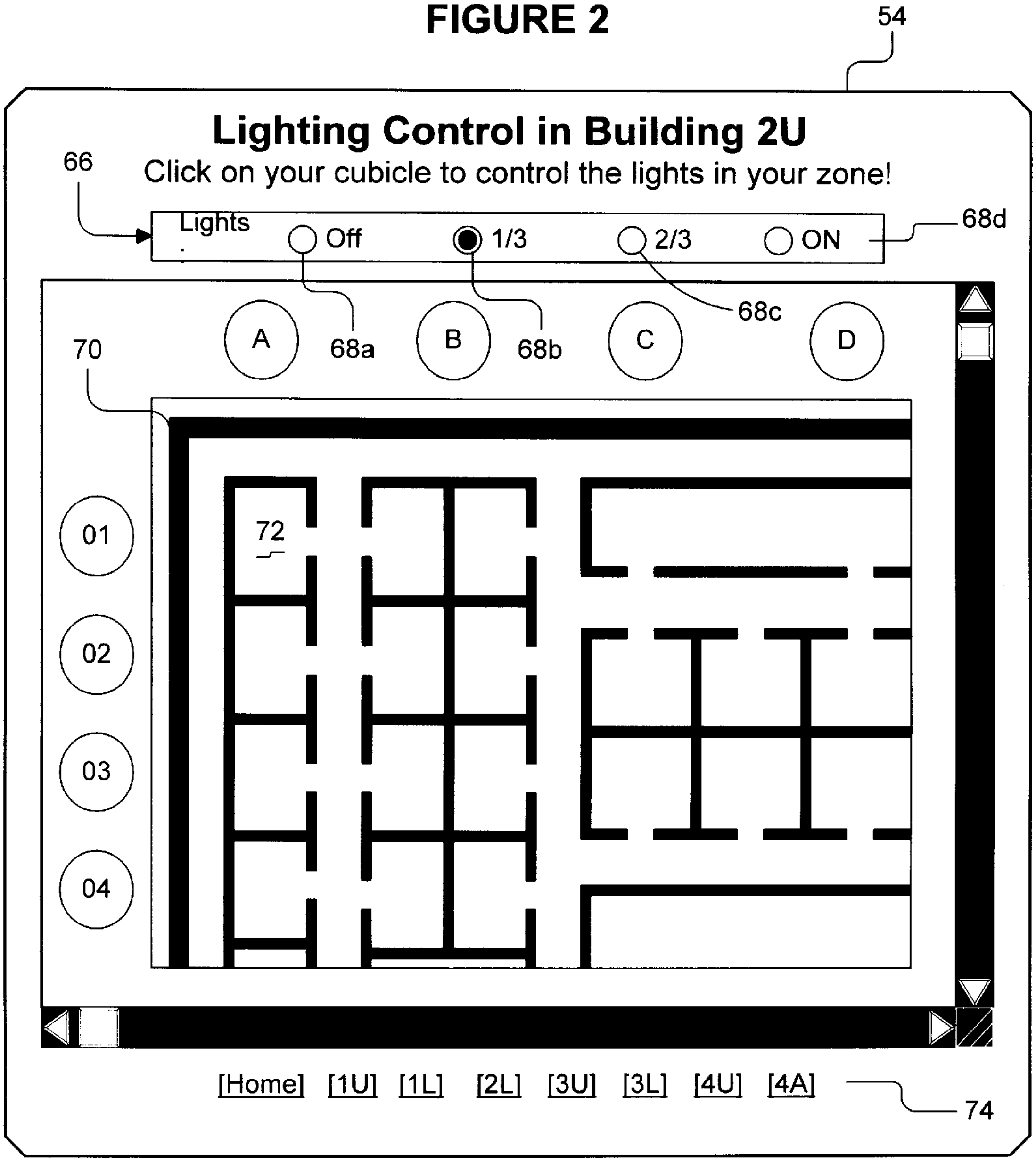
FIG. 2 is an illustration of an image map and a lighting control form, which are displayed by the web browser.

Additional reference is now made to FIG. 2. After the web browser 22 downloads an HTML file 44 from the server 26, the web browser 22 stores the HTML file 44 in the RAM 58 or the hard drive 60 and begins executing the tags in the HTML file 44. The tags instruct the web browser 22 to download and display the image map 46 corresponding to the downloaded HTML file 44 and to create and display a lighting control form 66. The lighting control form 66 includes graphical display elements 68*a*, 68*b*, 68*c* and 68*d* such as radio buttons and checkboxes indicating pre-selected lighting states such as lighting intensities. FIG. 2 happens to show a first radio button 68*a* corresponding to an "off" state, second and third radio buttons 68*b* and 68*c* corresponding to "⅓ intensity" and "⅔ intensity" and a fourth radio button corresponding to "full intensity." Using an I/O device 56 such as a mouse, a lighting load state is selected by clicking a graphical display element 68*a*, 68*b*, 68*c* or 68*d*. The lighting control form 66 could also include a text box (not shown) for entering a numerical value (or percentage) of lighting intensity.

The downloaded image map 46 graphically shows selectable representations of the lighting loads 12. For example, the image map 46 shows a floor plan 70 for the office building. When a first zone 72 on the floor plan 70 is clicked, the HTML file 44 instructs the web browser 22 to generate a second lighting control request LR2 identifying the lighting load state selected on the lighting control form 66 and information about (e.g., coordinates on the first zone 72. The HTML file 44 also instructs the web browser 22 to send the second lighting control request LR2 to the interface program 40 running on the server 26. A second lighting control request LR2 according to the HTTP protocol might include a GET command, the URL of the interface program 40 and a query string including the zone coordinates and the lighting load state.

The interface program 40 can be a Common Gateway Interface (CGI) program, which listens on a server port for the second lighting control requests LR2 from the web browser 22. When a second lighting control request LR2 is received, the interface program 40 identifies the lighting load 12 covering the first zone 72. The interface program 40 can use a lookup table to translate the zone coordinates into a lighting load identifier (e.g., a lighting load ID number). The interface program 40 can also perform access control to determine whether the web browser 22 making the second lighting control request LR2 is authorized to control the identified lighting load 12.

The interface program 40 sends a first lighting control request LR1 indicating the lighting load identifier and the lighting load state to the lighting daemon 42. In response, the lighting daemon 42 generates a digital command CMD for the interface module 28. The digital command CMD indicates the identified lighting load and lighting load state, but in a format expected by the interface control module 28. The interface module 28, in response, translates the digital command CMD into an analog control signal ARC, which causes a relay 14 to turn on the identified light at the intensity indicated in the digital command CMD.

Thus, clicking the second radio button **68*b* on the lighting control form 66 and then clicking a first zone 72 of the floor plan 70 will cause the lighting load 12 covering the first zone 72 to be turned on to ⅓ intensity. Clicking the first radio button 68*a* of the lighting control form 66 and clicking the first zone 72 again will cause the lighting load 12 covering the first zone 72** to be turned off.

The HTML file 44 could also generate a navigation bar 74 for linking to other floor plans. For example, clicking floor plan 1U on the navigation bar 74 would cause an HTML file 44 and image map 46 corresponding to floor plan 1U to be downloaded to the web browser 22.

The lighting daemon 42 also makes network connections with the Virtual Light Switch 20 and listens on the server port for first lighting control requests LR1 directly from the Virtual Light Switch 20. The Virtual Light Switch 20 controls an assigned lighting load 12. The Virtual Light Switch 20 can be a second personal computer 76 including a central processing unit 78, RAM 80, a disk drive 82, and a network card 84 for communicating over the computer network 24. The second personal computer 76 further includes a display 86 and I/O devices 88 such as a mouse and keyboard. A windows-based operating system 90 and VLS program 92 are stored on the disk drive 82. Unlike the web browser 22, which receives its instructions from the server 26, the Virtual Light Switch 20 receives its instructions; from the VLS program 92. If coded in the "Java" programming language, the VLS program 92 can be run on different platforms. When the instructions of the VLS program 92 are executed, the Virtual Light Switch 20 displays an icon (not shown) on the display 86. The icon represents the lighting load 12 that is controlled by the Virtual Light Switch 20. The icon can indicate the current state of the assigned lighting load 12. For example, an icon that is only half lit might indicate a light intensity of 50%.

When the icon is selected (for example, by positioning a cursor over the icon and clicking), a control panel 94 appears on the display 86 (see FIG. 3). The control panel 94 includes graphical display elements **96*a* and 96*b* such as radio buttons, sliders and scrollbars for entering lighting intensities and other lighting states. Controlling a graphical display element 96*a* or 96*b* causes the Virtual Light Switch 20 to generate and send first light control requests LR1 over the network 24 in real time. Thus, the Virtual Light Switch 20 controls its assigned lighting load 12** in real-time.

The first lighting control request LR1 from the Virtual Light Switch 20 directly identifies its assigned lighting load 12 and a state (e.g., light intensity) for the assigned lighting load 12. The Virtual Light Switch 20 can be preconfigured with the identifier for its assigned lighting load 12. The Virtual Light Switch 20 can be configured manually by accessing an identifier from a configuration file on the server 26 and saving the identifier on the disk drive 82. In the alternative, the Virtual Light Switch 20 could automatically receive a lighting identifier from the server 26 upon connection. The server 26 could use a CGI script for generating the lighting load identifier.

The lighting daemon 42 receives the first lighting control request LR1 on the network 24 and processes the first lighting control request LR1 by generating a digital command CMD for the interface module 28. The digital command CMD indicates the identified lighting load and lighting load state, but in the format expected by the interface control module 28.

As previously mentioned, the Virtual Light Switch 20 can also display the status of its assigned lighting load 12. To enable each Virtual Light Switch 20 to display the status of its assigned lighting load 12, the lighting daemon 42 communicates with the interface module 28 and monitors the power/communications bus 16 for analog relay commands ARC. When a wall-mounted switch 18 is flipped, for example, an analog relay command ARC is placed on the power/communications bus 16 and sent to a relay 14 associated with the wall-mounted switch 18. Via the interface module 28, the lighting daemon 42 detects the analog relay command ARC, generates a message including a lighting load identifier and the state of the light switch 18 affected by the analog relay command ACR, and multicasts the message to the Virtual Light Switch 20. Because the Virtual Light Switch 20 is configured with a matching identifier, it updates its icon for the change in state of the assigned lighting load 12.

For example, if the second personal computer 76 is located in a second zone, it might be configured to function as a Virtual Light Switch 20 for the lighting load 12 covering the second zone. The icon displayed on the display 78 of the second personal computer 76 would indicate the intensity of the lighting load 12 covering the second zone. Sliding a slider bar on the control panel 94 would cause the Virtual Light Switch 20 to generate and send first lighting control requests LR1 to the server 26 and to update the icon to indicate the changing intensities. Thus, moving the slider bar in one direction would cause a real-time increase in the intensity of the lighting load 12 covering the second zone and moving the slider bar in an opposite direction would cause a real-time decrease in the lighting load intensity. If a wall-mounted switch 18 for the lighting load 12 covering the second zone is turned off, the lighting daemon 42 would detect the resulting analog relay command ARC and multicast a message. The Virtual Light Switch 20 assigned to the second zone would update its icon to indicate that the lighting load 12 covering the second zone has been turned off.

Figure 4:
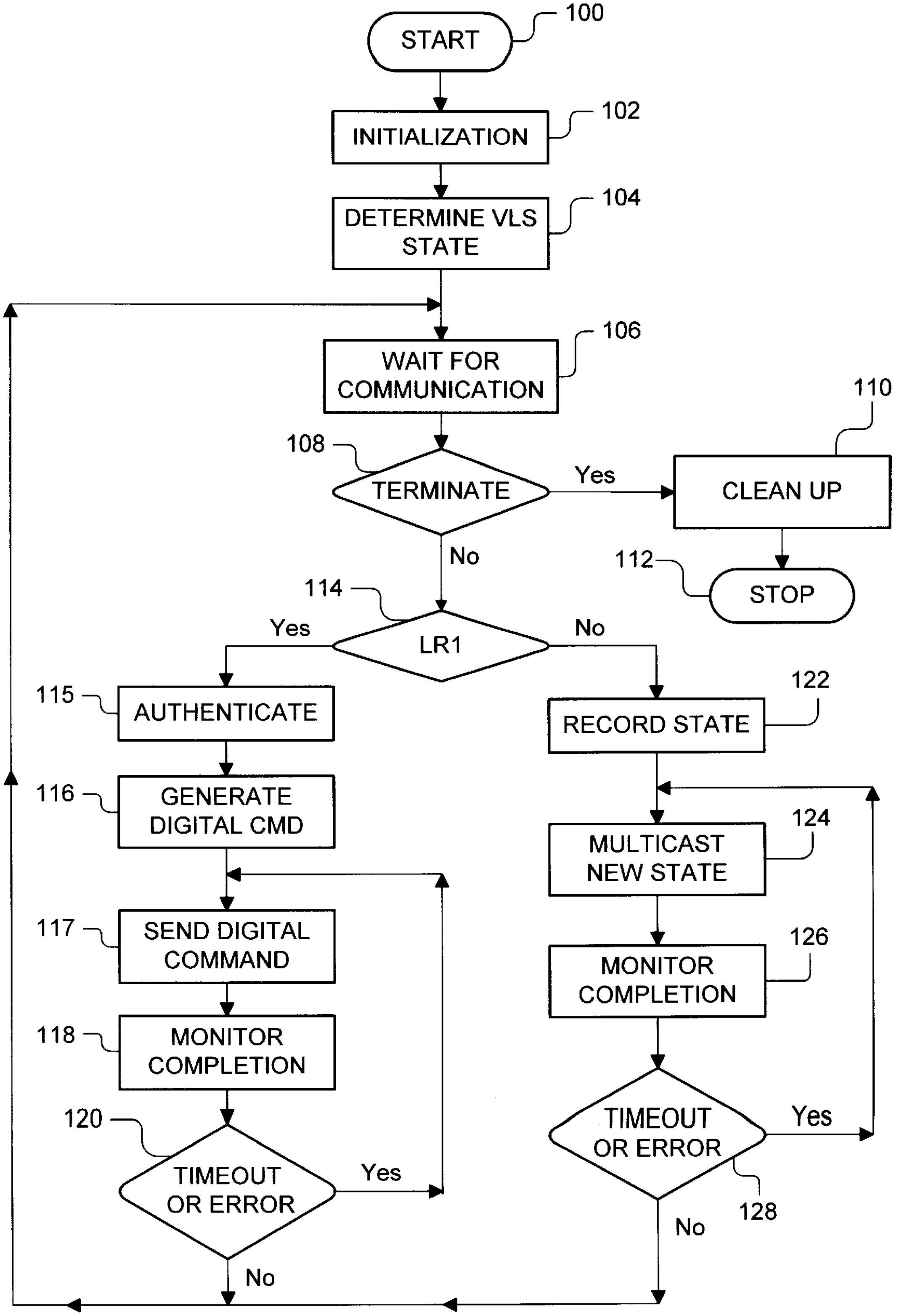
FIG. 4 is a flow control diagram of a lighting daemon, which is run on the server.

FIG. 4 shows the flow control for the lighting daemon 42. The lighting daemon 42 is run on the server 26 in the background. When started (block 100), the lighting daemon 42 performs initialization routines including logging onto the interface module 28 and establishing a connection with the interface module 28 (block 102).

After a connection with the interface module 28 has been established, the lighting daemon 42 can optionally read all of the current relay settings to determine the initial states of the lighting loads 12 (block 104). The initial states are recorded. The lighting daemon 42 can determine the relay settings by broadcasting queries on the power/communications bus 16 via the interface module 28 and then record the responses. Instead of determining the initial conditions of all of the lighting loads 12, the lighting daemon 12 could wait until a Virtual Light Switch 20 makes a connection with the server 26 and then determine and record the initial state of the connected Virtual Light Switch 20. In either scenario, the lighting daemon 42 would notify the Virtual Light Switch 20 of the initial lighting load state, thereby completing the connection.

Next, the lighting daemon 42 waits for communications from the network 24 and the interface module 28 (block 106). The lighting daemon 42 also waits for communications such as termination requests and first lighting control requests LR1 from the interface program 40.

If the lighting daemon 42 receives a termination request from a source such as the system operator (block 108), the lighting daemon 42 performs clean-up tasks (block 110) such as shutting down or terminating connections with the Virtual Light Switch 20 (e.g., making the Virtual Light Switch 20 unresponsive), flushing persistent internal states to the storage device 36 (e.g., closing open files), and logging off the interface module 28. Then the light daemon 42 terminates (block 112). The termination requests might be generated in order to perform maintenance such as daemon and system upgrades. The termination requests might also be generated internally in response to hardware and software faults.

If the lighting daemon 42 receives a first lighting control request LR1 (block 114), the lighting daemon 42 optionally performs authentication or some other security check (block 115), generates a digital command CMD (block 116) and sends the digital command CMD to the interface module 28 (block 117). The Virtual Light Switch 20 and the interface program 40 would typically use the same protocol for communicating with the lighting daemon 42. After the lighting daemon 42 sends the digital command CMD to the interface module 28 (block 117), it waits for an acknowledgment from the interface module 28 (block 118). If the acknowledgement is not received (block 120) due to, for instance, a timeout or transmission error, the lighting daemon 42 resends the digital command CMD to the interface module 28 (block 117). If an acknowledgment is received (block 120), the lighting daemon 42 resumes waiting for the next communication or message (block 106).

If the lighting daemon 42 receives an analog relay command ARC from the interface module 28 indicating a change in state of a lighting load (block 114), the lighting daemon 42 records the new state of the lighting load 12 (block 122). Then the lighting daemon 42 multicasts a message to the Virtual Light Switch 20 affected by the change in light state (block 124) and waits for an acknowledgment from the Virtual Light Switch (block 126). If the acknowledgement is not received (block 128) due to, for instance, a timeout or transmission error, the lighting daemon 42 resends the message to the Virtual Light Switch 20 (block 124). If an acknowledgment is received (block 128), the lighting daemon 42 resumes waiting for the next communication or message (block 106).

Functions such as waiting for and responding to first lighting control requests LR1 (blocks 106, 108 and 114 to

120), and monitoring and responding to changes in lighting load states (blocks 106, 108, 114 and 122 to 128) are shown as being performed sequentially. However, these functions could be performed in parallel by appropriate hardware such as a Symmetric Multiprocessor Machine (SMP). Thus, a lighting daemon 42 running on an SMP could monitor and respond to lighting load changes at the same time it waits for and responds to first lighting control requests LR1.

Figure 5:
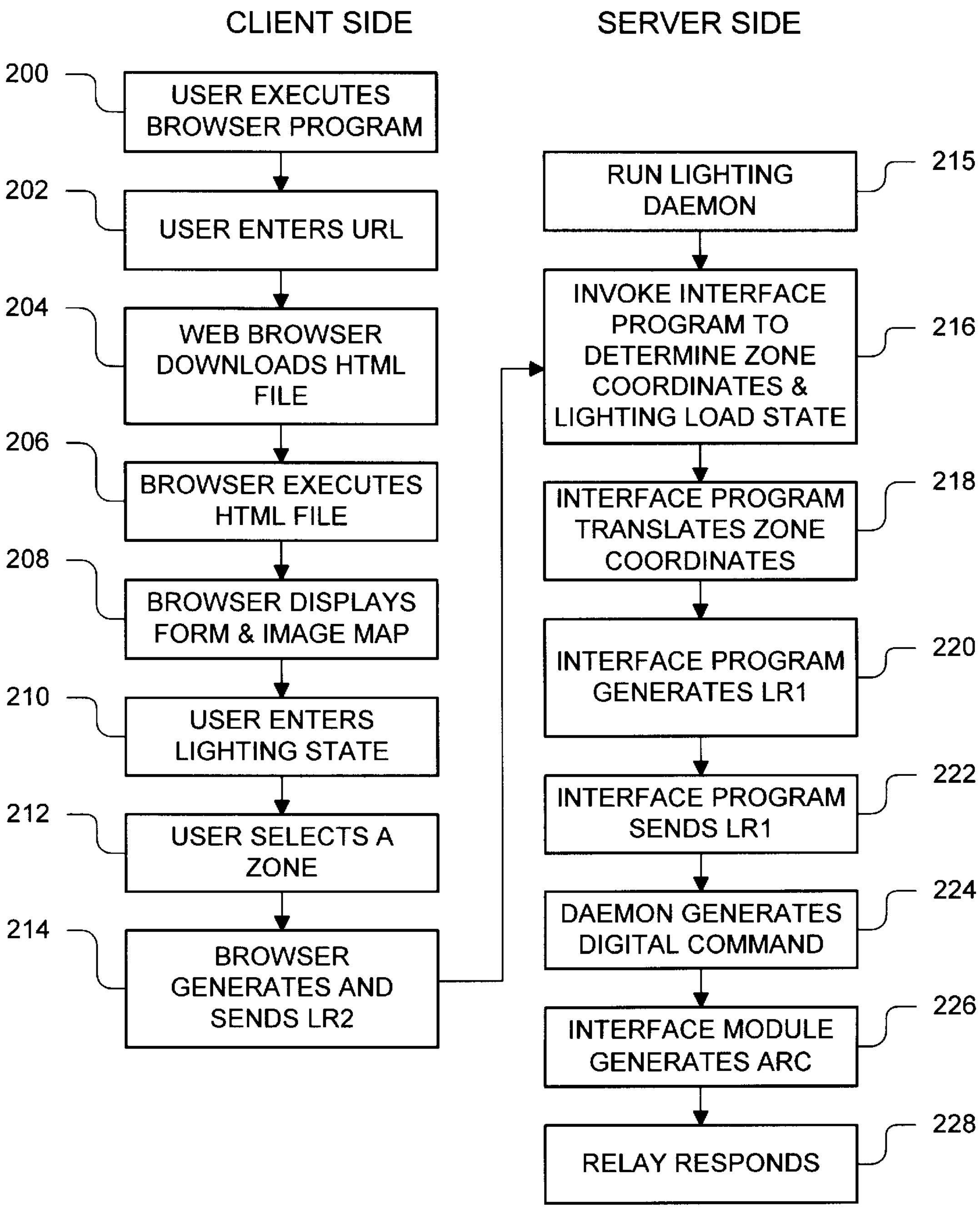
FIG. 5 is a flowchart of a method of controlling a lighting load using the server and the web browser.

FIG. 5 shows steps for controlling a lighting load 12 via the web browser 22. With the browser program 64 running on the first personal computer 48 (step 200), a user enters the URL of the HTML file 44 (step 202) corresponding to the floor plan. This causes the web browser 22 to download the HTML file 44 from the server 26 (step 204). The web browser 22 begins executing the HTML file 44 (step 206), generating and displaying the lighting control form 66 and downloading and displaying the image map 46 corresponding to the HTML file 44 (step 208). The user clicks a radio button indicating a light intensity (step 210) and then a zone 72 of the floor plan 70 (step 212). When the zone 72 is clicked on, the web browser 22 generates and sends a second lighting control request LR2 to the interface program 40 (step 214).

The interface program 42 is invoked to determine the zone coordinates and light state indicated by the second lighting control request LR2 (step 216) and translates the zone coordinates into a lighting load identifier (step 218). Then the interface program 40 generates a first lighting control request LR1 indicating the lighting load identifier and lighting load state (step 220), and sends the first lighting control request LR1 to the lighting daemon 42 (step 222), which is already running on the server 26 (step 215).

In response to the first lighting control request LR1, the lighting daemon 42 generates a digital command CMD for the interface module 28 (step 224). The interface module 28, in turn, generates an analog relay command ARC and multicasts the analog relay command ARC on the power/communications bus 16 (step 226). The analog relay command ARC is received by many of the relays 14, but only the relay for the lighting load covering the selected zone is controlled according to the requested lighting load state (step 228).

Figure 6:
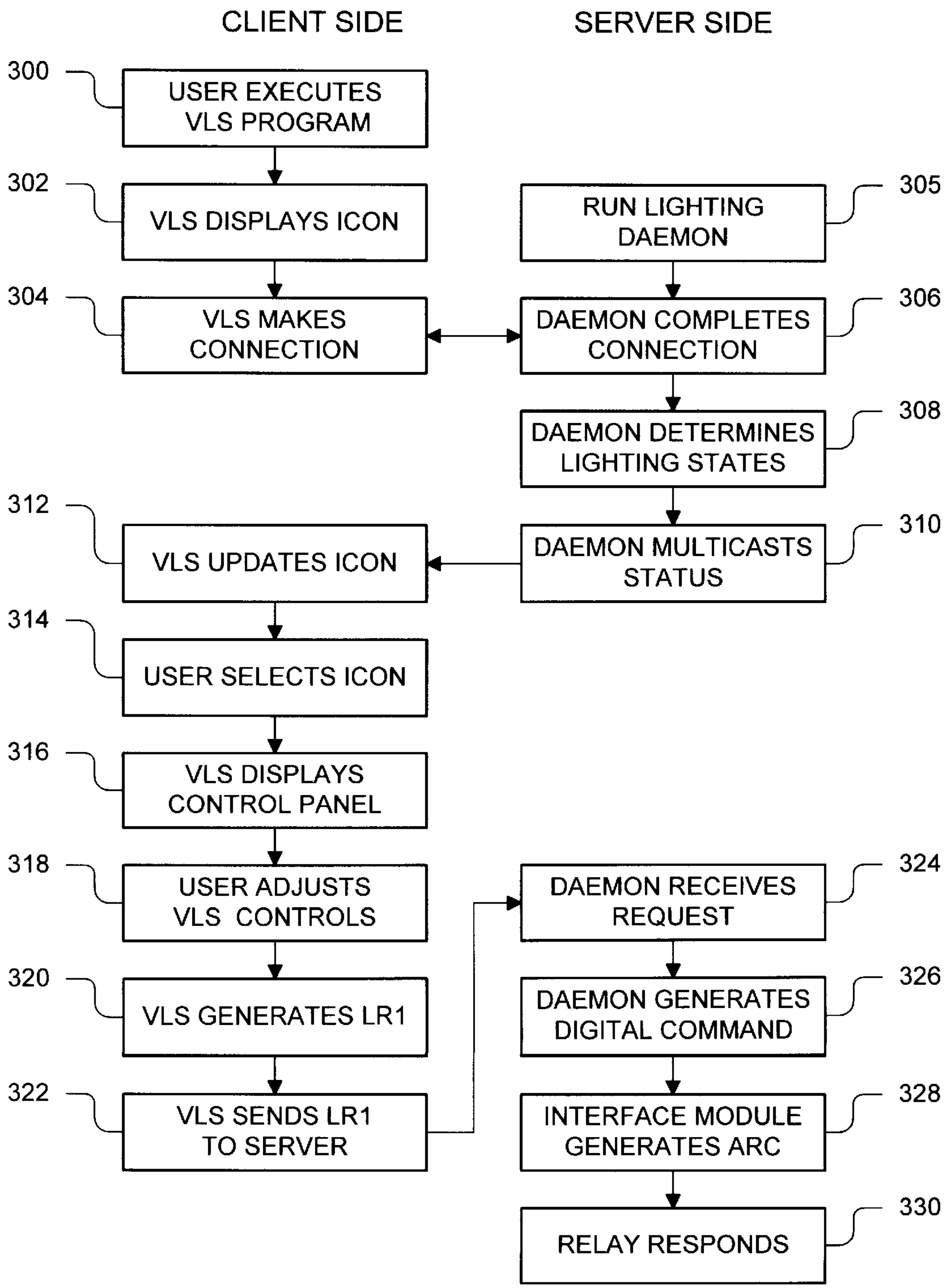
FIG. 6 is a flowchart of a method of controlling a lighting load using the server and the Virtual Light Switch.

FIG. 6 shows steps for controlling a lighting load 12 via a Virtual Light Switch 20. By way of example, the Virtual Light Switch 20 controls an overhead light 12. The VLS program 92 is executed on the second personal computer 76 (step 300). The Virtual Light Switch 20 displays the icon on the display 86 (step 302) and initiates a connection with the lighting daemon 42 (step 304), which is already running on the server 26 (step 306). The lighting daemon 42 determines the current state of the overhead light 12 (step 308), and multicasts a message indicating the current state on the computer network 24 (step 310). The Virtual Light Switch 20 for the overhead light 12 receives the message and updates the icon to indicate the current state of the overhead light 12 (step 312).

When the user selects the icon (step 314), the control panel 94 is shown on the display 86 (step 316). Each time the user moves a graphical control 96*a* or 96*b* on the control panel 94 (step 318), the Virtual Light Switch 20 generates a first lighting control request LR1 indicating the light identifier for the overhead lighting load and the light state for the overhead lighting load 12 (step 320). The first lighting control request LR1 is sent to the server 26 (step 322).

The lighting daemon 42 receives the first lighting control request LR1 (step 324) and generates a digital command CMD for the interface module 28 (step 326). The interface module 28, in turn, generates an analog relay command ARC for the power/communications bus 16 (step 328). The analog relay command ARC is received by many of the relays 14, but only the relay 14 for the overhead lighting load 12 is controlled (step 330).

Thus disclosed is a lighting control system 10 that allows lighting loads 12 to be controlled from the convenience of a computer. No longer is it necessary to walk over to a wall-mounted switch 18 or rely upon facilities management to control the lighting loads 12. Additionally, energy is conserved because the lighting control system 10 makes it easier to turn off the lighting loads and, therefore, makes it less likely that a person would leave the lighting loads on after leaving the office. Some people, especially those in a rush to leave the office, do not want to be burdened with the chore of turning off the lighting loads.

The lighting control system 10 makes use of existing infrastructure—computers and networks. Therefore, the lighting control system 10 can be implemented and expanded quickly and inexpensively.

The lighting control system 10 even allows the lighting loads 12 to be controlled outside of the facility, from a remote location. If a person can't remember whether the lights were left on in his office, he could dial into the computer network 24 using a modem or ISDN line on his home computer, download the appropriate HTML file 44 or run a VLS program 92 on his home computer, and turn off the lighting loads in his office.

The lighting control system 10 is applicable to any facility having centralized control of the lighting loads. For example, the lighting control system 10 could be applied to small businesses, schools and homes. Therefore, the lighting control system 10 is not limited only to office buildings.

The invention is not limited to the specific embodiments described above. For example, the lighting control form 66 can include graphical display elements for controlling lighting characteristics other than light intensity. If multiple lights cover a single zone, the lighting control form 66 can also include graphical display elements for controlling specific lights. For example, the lighting control form 66 might allow a selection of different colored lights (e.g. red and blue lights) or lights at different levels (e.g. upper and lower lights). Therefore, the selections on the lighting control form 66 ultimately depend upon the number and types of lights being controlled.

As another example, the image maps 46 are not limited to static image maps. Instead, dynamic image maps could show current lighting load states for each of the zones. A lighting state could be represented by showing a zone in a shade of gray or yellow. Additionally, the dynamic image maps could be updated for changes in lighting load states. Dynamic image mapping could be implemented via dynamic HTML, a CGI program and the lighting daemon 42.

Figure 7:
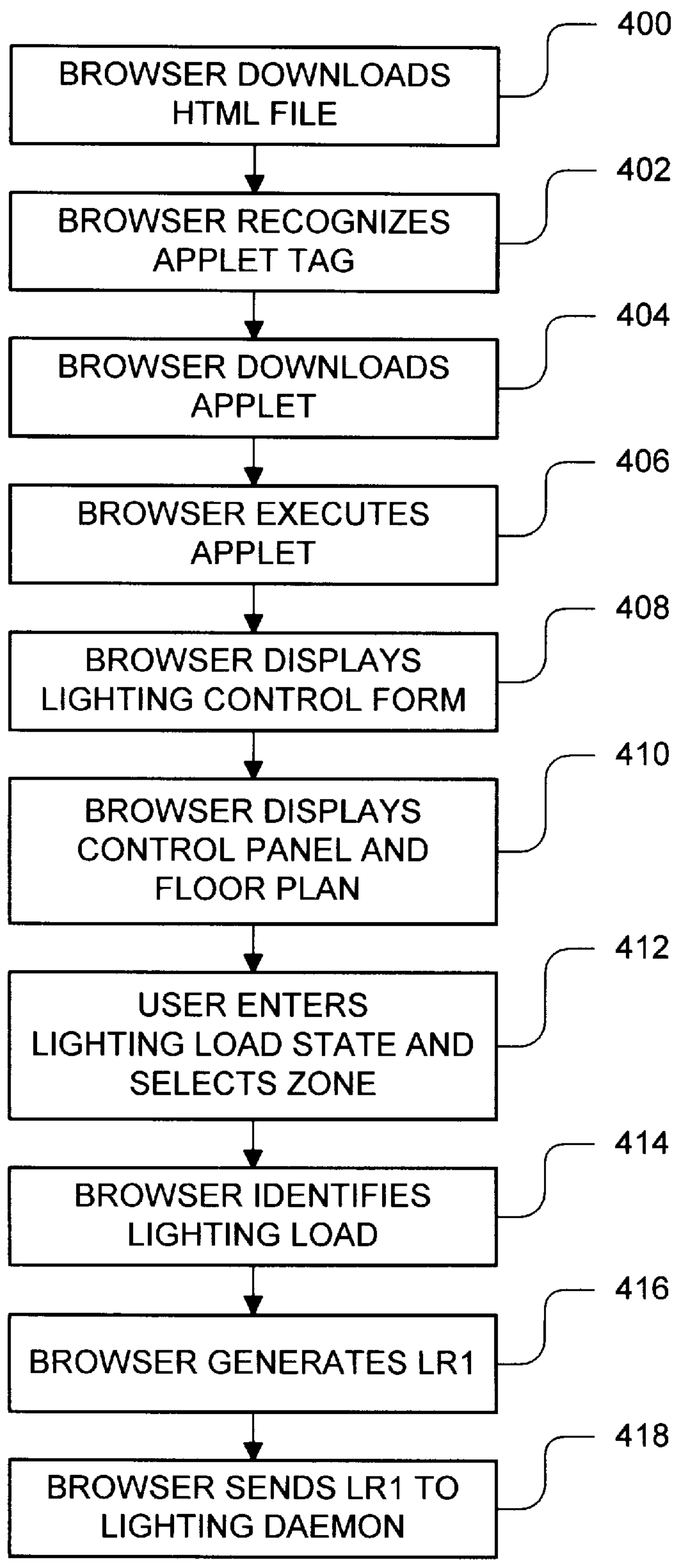
FIG. 7 is a flowchart of a method of controlling a lighting load using the server, a Java-enhanced web browser and an applet.

Yet another example is shown in FIG. 7. The HTML file 44 can utilize an applet 98 (see FIG. 1) for creating the image map 46 and displaying the lighting control form 66 instead of having the HTML file 44 create and display a lighting control form 66. The HTML file 44 includes an applet tag. A Java-enhanced web browser downloads the HTML file 44 (step 400), recognizes the applet tag (step 402), downloads the applet 98 (which is identified by the applet tag) (step 404) and begins executing the applet 98 (step 406). When executed, the applet 98 instructs the Java-enhanced web browser to display the lighting control form 66 (step 408) and download and display a pictograph of the floor plan (step 410). When a lighting load state is entered and a zone on the floor plan is selected (step 412), the applet 98 identifies the lighting load covering the selected zone (step 414), generates a first (not second) lighting request LR1 indicating the identified lighting load and the light state (step 416), and sends the first lighting control request LR1 directly to the lighting daemon 42 (step 418). Thus, the applet 98 bypasses the interface program 40. Moreover, the applet 98 allows a greater selection of controls (e.g., sliders and scrollbars) for entering the intensity and other characteristics of the lighting loads 12. A web browser that is not Java-enhanced would simply ignore the applet tag and, instead, download an image map 46 and create and display a lighting control form 66 as instructed by the other tags in the HTML file 44.

Instead of utilizing an applet 98, the HTML file could utilize JavaScript scripting or Active-X controls. A web browser that is not JavaScript scripting or Active-X enabled would simply display a lighting control form 66.

Instead of using CGI scripting for the interface program 40 program, the interface program 40 could be implemented by programs written in a native language such as C++. Moreover, the interface program 40 is not limited to CGI. Rather, the interface program 40, if used, could be any program that allows the server (or another computer) to translate the zone coordinates into lighting load identifiers.

The invention is not limited to an image map 46 of a floor plan. Rather, the invention can use any pictograph that allows lighting loads 12 to be identified and selected.

The lighting daemon 42 could be run on the same server 26 as the interface program 40 or it could be on a different server. If the lighting daemon 42 is run on a different server, the interface program 42 would relay the first lighting control request LR1 to the server on which the lighting daemon 42 is running.

The lighting daemon 42 can retrieve the first lighting control requests LR1 by means other than by listening to ports. For example, the lighting daemon 42 could receive tokens.

The lighting daemon 42 is not restricted to run on any particular operating system. Although the term "daemon" is associated with the Unix paradigm, the lighting daemon 42 is a lighting control program that can be adapted for any operating system. In the Novell paradigm, the lighting daemon 42 might be referred to as a lighting "network loadable module" or "NLM."

Figure 8:
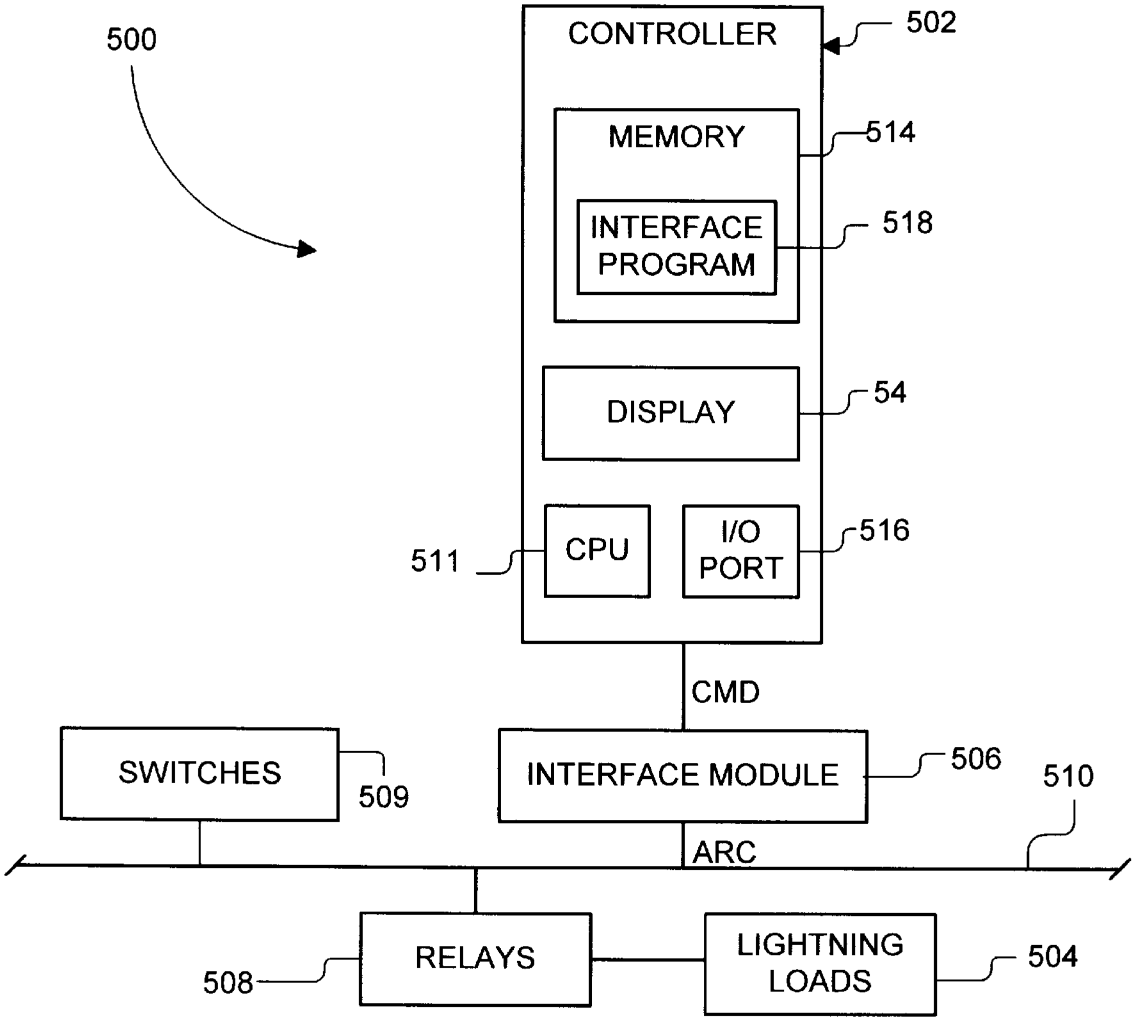
FIG. 8 is a block diagram of an alternative embodiment of a lighting control system according to the present invention.

The invention is not even limited to a server 26 and computer network 24. For example, FIG. 8 shows a lighting control system 500 in which a single controller 502 controls multiple lighting loads 504 via an interface module 506, multiple relays 508, switches 509 and a power/communications bus 510. The controller 502 can be a personal computer having a central processing unit 511, a display 512, memory 514 and an I/O port 516 for interfacing with the interface module 506. Encoded in the memory 514 is a standalone program including a plurality of instructions 518. When executed, the instructions 518 cause the controller 502 to display a pictograph and control panel on the display 512. The pictograph includes representations of the lighting loads 504. When a lighting load state is entered into the controller 502 and a representation on the pictograph is selected, the controller 502 generates digital commands for the interface module 506. Unlike the server 26 above, the controller 502 does not receive lighting control requests via a computer network.

Figure 9:
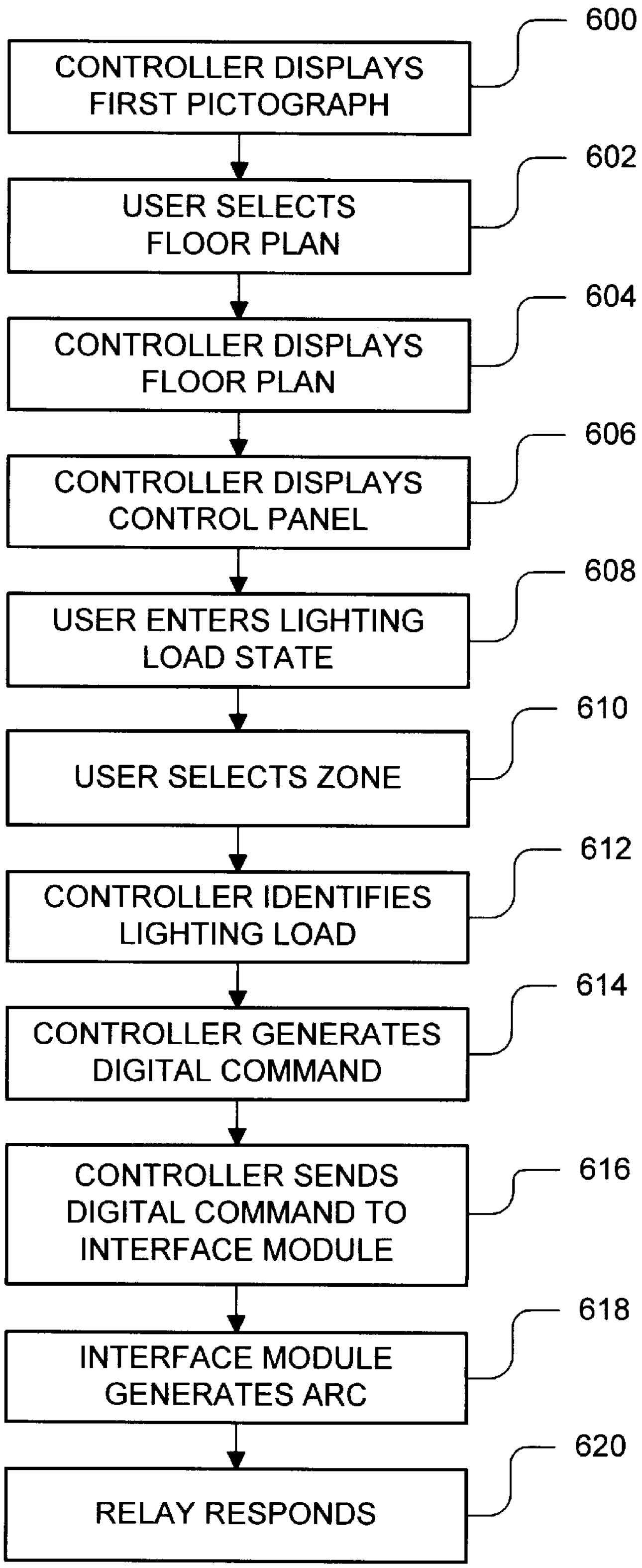
FIG. 9 is a flowchart of a method of controlling multiple lighting loads using a controller, which forms a part of the alternative embodiment of the lighting control system.

FIG. 9 shows a method in which the controller 502 controls multiple lighting loads 504 in an office building.

When the instructions 518 are executed, the controller 502 displays a first pictograph showing different floor plans (block 600). When a floor plan is selected (602), the controller 502 displays a second pictograph of the selected floor plan (block 604). The controller 502 also displays a control panel (block 606). When a lighting load state is entered into the control panel (block 608) and a zone on the floor plan are selected (block 610), the controller 502 identifies the lighting load 504 covering the selected zone (block 612) and generates a digital command for the identified lighting load 504 (block 614). The controller 502 sends the digital command to the interface module 506 via the I/O port 516 (block 616). The interface module 506, in response, generates an analog relay command for the power/communications bus 510 (block 618). The relay 508 associated with the identified lighting load 504 responds to the analog relay command by controlling the identified lighting load 504 (block 620).

The Network Appliances 26 are not limited to Virtual Light switches 20 and web browsers 22 that are based on personal computers. Other types of Network Appliances 26 could include personal digital assistants (PDAs), cell phones, calculators and information appliances such as smart toasters.

These considerations, along with other considerations such as the design of the computer network, are left to the discretion of the designer of the lighting control system and the application for which the lighting control system is intended.

Therefore, although the specific embodiments of the invention have been described and illustrated, the invention is not limited to the specific forms or arrangements of parts so described and illustrated. The invention is limited only by the claims that follow.

What is claimed is:

1. A computer for controlling a plurality of lighting loads, the computer comprising:

a display; and memory encoded with executable instructions, the instructions, when executed, causing the computer to show a pictograph and a control panel on the display, the pictograph including selectable representations of the lighting loads, the control panel allowing a lighting load state to be entered into the computer, the instructions further causing the computer to generate a lighting control request when a representation on the pictograph is selected, the lighting control request identifying a lighting load corresponding to the selected representation, the lighting control request further identifying the lighting control state entered into the computer, and send the lighting control request to a computer network, whereby the lighting control request is used for controlling the lighting load corresponding to the selected representation.

2. The computer of claim 1, further comprising means for connecting to a computer network, the instructions further instructing the computer to send the lighting control request to the computer network.

3. The computer of claim 1, wherein the instructions are included in a web browser program and an HTML file, the web browser program and the HTML file causing the computer to download and display a pictograph-based image map including the selectable representations, the web browser program and the HTML file also causing the computer to download and display an HTML lighting control form for allowing the lighting load state to be entered into the computer.

4. The computer of claim 1, wherein the lighting control form includes a plurality of graphical display elements for entering the lighting load states into the computer.

5. The computer of claim 2, wherein the web browser program and the HTML file instructions cause the computer to generate the lighting control request including coordinates of the selected representation and the lighting state entered into the computer when a representation on the image map is selected.

6. The computer of claim 1, wherein the instructions are included in a web browser program, an HTML file and an applet, the web browser program, the HTML file and the applet causing the computer to download and display the pictograph and display a control panel for allowing the lighting load state to be entered into the computer.

7. The computer of claim 6, wherein the lighting control panel includes a plurality of graphical display elements for entering the lighting load states into the computer.

8. The computer of claim 6, wherein the web browser program, the HTML file and the applet cause the computer to generate the lighting control request including an identification of a lighting load and the lighting state entered into the computer.

9. The computer of claim 1, wherein the pictograph includes a clickable floor plan.

10. The computer of claim 9, wherein the pictograph is link,able to other clickable floor plans.

11. The apparatus of claim 1, further comprising an interface module adapted to be coupled to a power/communications bus; and wherein the instructions further instruct the computer to translate the lighting control requests into digital commands for the interface module, the digital commands indicating the identified lighting load and the lighting state of the identified lighting load.

12. A method of controlling a plurality of lighting loads using a computer connectable to a computer network, the method comprising:

displaying a pictograph including a plurality of selectable representations of the lighting loads on the computer;

displaying a control panel on the computer, the control panel allowing a lighting load state to be entered into the computer;

generating a lighting control request when a lighting load state is entered into the computer and a selectable representation on the pictograph is selected; and sending the lighting control request to the computer network whereby the lighting control request is used for controlling the lighting load corresponding to the selected representation.

13. The method of claim 12, wherein the lighting control requests are sent to the network using a TCP/IP protocol.

14. The method of claim 12, wherein the lighting control requests include coordinates of the selected representation and the lighting load state.

15. The method of claim 12, wherein the lighting control requests include a lighting load identifier and the lighting load state.

16. An article of manufacture for a computer, the article comprising:

computer memory; and a plurality of executable instruction encoded in the memory, the instructions, when executed, causing the computer to display a pictograph and a control panel, the pictograph including selectable representations of the lighting loads, the control panel allowing a lighting load state to be entered into the computer, the instructions further causing the computer to generate a lighting control request when a representation on the pictograph is selected, the lighting control request identifying a lighting load corresponding to the selected representation, the lighting control request further identifying the lighting control state entered into the computer and send the lighting control request to a computer network, whereby the lighting control request is used for controlling the lighting load corresponding to the selected representation.

17. The article of claim 16, wherein the instructions are included in a web browser program and an HTML file, the web browser program and the HTML file causing the computer to download and display an image map including the selectable representations, the web browser program and the HTML file also causing the computer to download and display an HTML lighting control form for allowing the lighting load state to be entered into the computer.

18. The article of claim 17, wherein the web browser program and the HTML file instructions cause the computer to generate the lighting control request including coordinates of the selected representation and the lighting state entered into the computer when a representation on the image map is selected.

19. The article of claim 16, wherein the instructions are included in a web browser program, an HTML file and an applet, the web browser program, the HTML file and the applet causing the computer to download and display the pictograph and display a control panel for allowing the lighting load state to be entered into the computer.

20. The article of claim 19, wherein the web browser program, the HTML file and the applet cause the computer to generate the lighting control request including an identification of a lighting load and the lighting state entered into the computer when a representation on the pictograph is selected.

21. The article of claim 16, wherein the pictograph includes a clickable floor plan.

22. The article of claim 21, wherein the pictograph is linkable to other clickable floor plans.

* * * * *